(12) United States Patent
Belnet et al.

(10) Patent No.: US 7,840,001 B2
(45) Date of Patent: Nov. 23, 2010

(54) DATA PROCESSING APPARATUS

(75) Inventors: Lionel Belnet, Villeneuve-Loubet (FR);
Stephane Eric Sebastien Brochier, Chateauneuf de Grasse (FR); Simon Andrew Ford, Cambridge (GB)

(73) Assignee: ARM Limited, Cambridge (GB)

( * ) Notice: Subject to any disclaimer, the term of this patent is extended or adjusted under 35 U.S.C. 154(b) by 1332 days.

(21) Appl. No.: 11/266,474

(22) Filed: Nov. 4, 2005

(65) Prior Publication Data
US 2007/0104324 A1   May 10, 2007

(51) Int. Cl.
*H04K 1/06* (2006.01)
(52) U.S. Cl. .................... 380/37; 712/233; 712/244
(58) Field of Classification Search .................. None
See application file for complete search history.

(56) References Cited

U.S. PATENT DOCUMENTS 6,748,493 B1 * 6/2004 Arroyo et al. ............... 711/130
6,848,074 B2 * 1/2005 Coombs ..................... 714/795
6,990,569 B2 * 1/2006 Hill ............................ 712/227
2003/0225998 A1 * 12/2003 Khan et al. ................. 712/210

* cited by examiner

*Primary Examiner*—Pramila Parthasarathy
(74) *Attorney, Agent, or Firm*—Nixon & Vanderhye P.C.

(57) ABSTRACT

Data processing apparatus and methods are provided. One data processing apparatus comprises: a plurality of pipelined stages, each of the plurality pipelined stages being operable in each processing cycle to receive a group of data elements from an earlier pipelined stage; permute logic operable to buffer 'n' of the groups of data elements over a corresponding 'n' processing cycles thereby creating a bubble within pipelined stages, and forwarding logic operable, once the 'n' of the groups of data elements have been buffered by the permute logic, to forward permuted groups of data elements comprising the data elements reordered by the permute logic to fill the bubble within the pipelined stages. By forwarding the data elements to fill the bubble an improved throughput can be achieved and since a constant stream of data can be transformed without the need to increase the number of input or output registers required to support the permute logic, the need to duplicate the permute logic or the need to introduce any additional storage elements.

17 Claims, 6 Drawing Sheets

Fig. 3A 4 element structure (VLD4.16.)

| T | R1 | A | B | C | D | E1 | E2 | E3 | E4 |
|---|---|---|---|---|---|---|---|---|---|
| 0 | a0 | - | - | - | - | - | - | - | - |
| 1 | a1 | b0(0) | b1(1) | b2(2) | b3(3) | - | - | - | - |
| 2 | a2 | b0(0,4) | b1(1,5) | b2(2,6) | b3(3,7) | X | - | - | - |
| 3 | a3 | b0(0,4,8) | b1(1,5,9) | b2(2,6,10) | b3(3,7,11) | X | X | - | - |
| 4 | a0' | b0 | b1 | b2 | b3 | X | X | X | - |
| 5 | a1' | b0'(0) | b1'(1) | b2'(2) | b3'(3) | b3 | b2 | b1 | b0 |
| 6 | a2' | b0'(0,4) | b1'(1,5) | b2'(2,6) | b3'(3,7) | X' | b3 | b2 | b1 |
| 7 | a3' | b0'(0,4,8) | b1'(1,5,9) | b2'(2,6,10) | b3'(3,7,11) | X' | X' | b3 | b2 |
| 8 | - | b0' | b1' | b2' | b3' | X' | X' | X' | b3 |
| 9 | - | - | - | - | - | b3' | b2' | b1' | b0' |
| 10 | - | - | - | - | - | - | b3' | b2' | b1' |
| 11 | - | - | - | - | - | - | - | b3' | b2' |
| 12 | - | - | - | - | - | - | - | - | b3' |
| 13 | - | - | - | - | - | - | - | - | - |

Fig. 3B 3 element structure (VLD3.16.)

| T | R1 | A | B | C | D | E1 | E2 | E3 | E4 |
|---|----|---|---|---|---|----|----|----|----|
| 0 | a0 | - | - | - | - | - | - | - | - |
| 1 | a1 | X | b0(0,3) | b1(1) | b2(2) | - | - | - | - |
| 2 | a2 | X | b0(0,3,6) | b1(1,4,7) | b2(2,5) | X | - | - | - |
| 3 | a0' | X | b0 | b1 | b2 | X | X | - | - |
| 4 | a1' | X' | b0'(0,3) | b1'(1) | b2'(2) | b2 | b1 | b0 | - |
| 5 | a2' | X' | b0'(0,3,6) | b1'(1,4,7) | b2'(2,5) | X' | b2 | b1 | b0 |
| 6 | - | X' | b0' | b1' | b2' | X' | X' | b2 | b1 |
| 7 | - | - | - | - | - | b2' | b1' | b0' | b2 |
| 8 | - | - | - | - | - | - | b2' | b1' | b0' |
| 9 | - | - | - | - | - | - | - | b2' | b1' |
| 10 | - | - | - | - | - | - | - | - | b2' |
| 11 | - | - | - | - | - | - | - | - | - |

Fig. 3C 2 element structure (VLD2.16.)

| T | R1 | A | B | C | D | E1 | E2 | E3 | E4 |
|---|----|---|---|---|---|----|----|----|----|
| 0 | a0 | - | - | - | - | - | - | - | - |
| 1 | a1 | X | X | b0(0,2) | b1(1,3) | - | - | - | - |
| 2 | a0' | X | X | b0 | b1 | X | - | - | - |
| 3 | a1' | X' | X' | b0'(0,2) | b1'(1,3) | b1 | b0 | - | - |
| 4 | - | X' | X' | b0' | b1' | X' | b1 | b0 | - |
| 5 | - | - | - | - | - | b1' | b0' | b1 | b0 |
| 6 | - | - | - | - | - | - | b1' | b0' | b1 |
| 7 | - | - | - | - | - | - | - | b1' | b0' |
| 8 | - | - | - | - | - | - | - | - | b1' |
| 9 | - | - | - | - | - | - | - | - | - |

DATA PROCESSING APPARATUS

BACKGROUND OF THE INVENTION

1. Field of the Invention

The present invention relates to a data processing apparatus and method. Embodiments of the present invention relate to a data processing apparatus and method operable to perform permute operations.

2. Description of the Prior Art

Permute operations are known. Permute operations typically take a sequence of data elements and reorder or permutate the data elements to create a new sequence.

Figure 1:
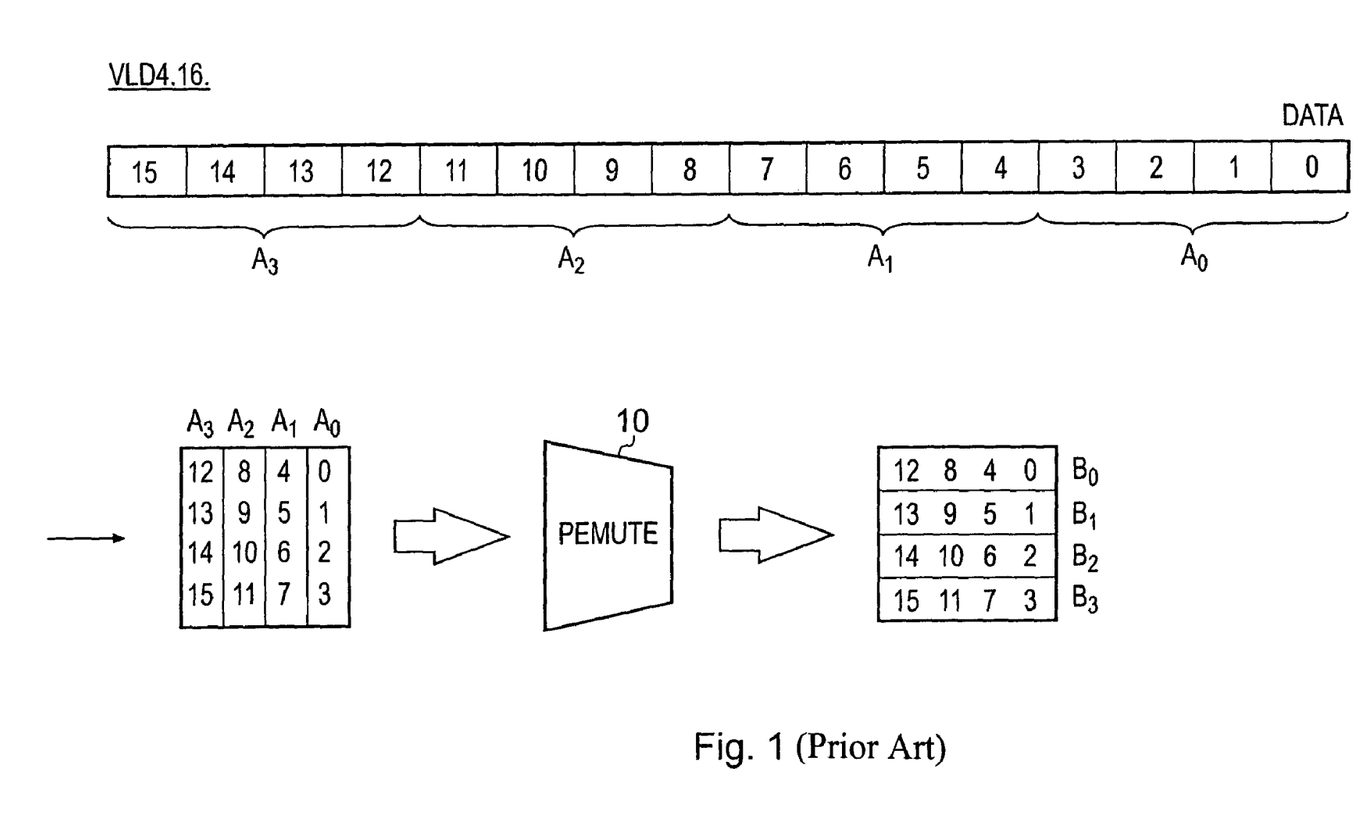
FIG. 1 illustrates an example known permute operation.

For example, as shown in FIG. 1, a sequence of consecutive data elements 0 to 15 are provided. A permute unit 10 is provided which performs a permute operation on the data elements in response to a permute instruction. Such an instruction is typically supported by a vector or single instruction multiple data (SIMD) data processing apparatus for supporting transformation between arrays of structures (AoS) and structures of arrays (SoA). UK patent application 2,409,063 filed on 9 Dec. 2003 by ARM Limited describes examples of such permute instructions.

The sequence of data elements is spilt into a number of groups of data elements $A_0$ to $A_3$. Each group contains a fixed number of data elements. In this example, each group contains 4, 16-bit data elements. As illustrated in FIG. 1, group $A_0$ contains data elements 0 to 3; group $A_1$ contains data elements 4 to 7; group $A_2$ contains data elements 8 to 11; and group $A_3$ contains data elements 12 to 15. Each group of data elements is provided to the permute unit 10 and is buffered therein. Once all 4 groups of data elements have been provided to the permute logic 10 then the permute logic 10 will output the buffered data elements as permuted groups in which the data elements are provided in a revised order. It will be appreciated that the permuted groups can not be output until all groups of data elements have been received by the permute logic 10. In this example, 4 permuted groups $B_0$ to $B_3$ are output, each of which contains a data element from a different group $A_0$ to $A_3$ provided to the permute logic 10. Accordingly, permuted group $B_0$ contains data elements 0, 4, 8 and 12; permuted group $B_1$ contains data elements 1, 5, 9 and 13; permuted group $B_2$ contains data elements 2, 6, 10 and 14; and permuted group $B_3$ contains data elements 3, 7, 11 and 15.

Figure 2:
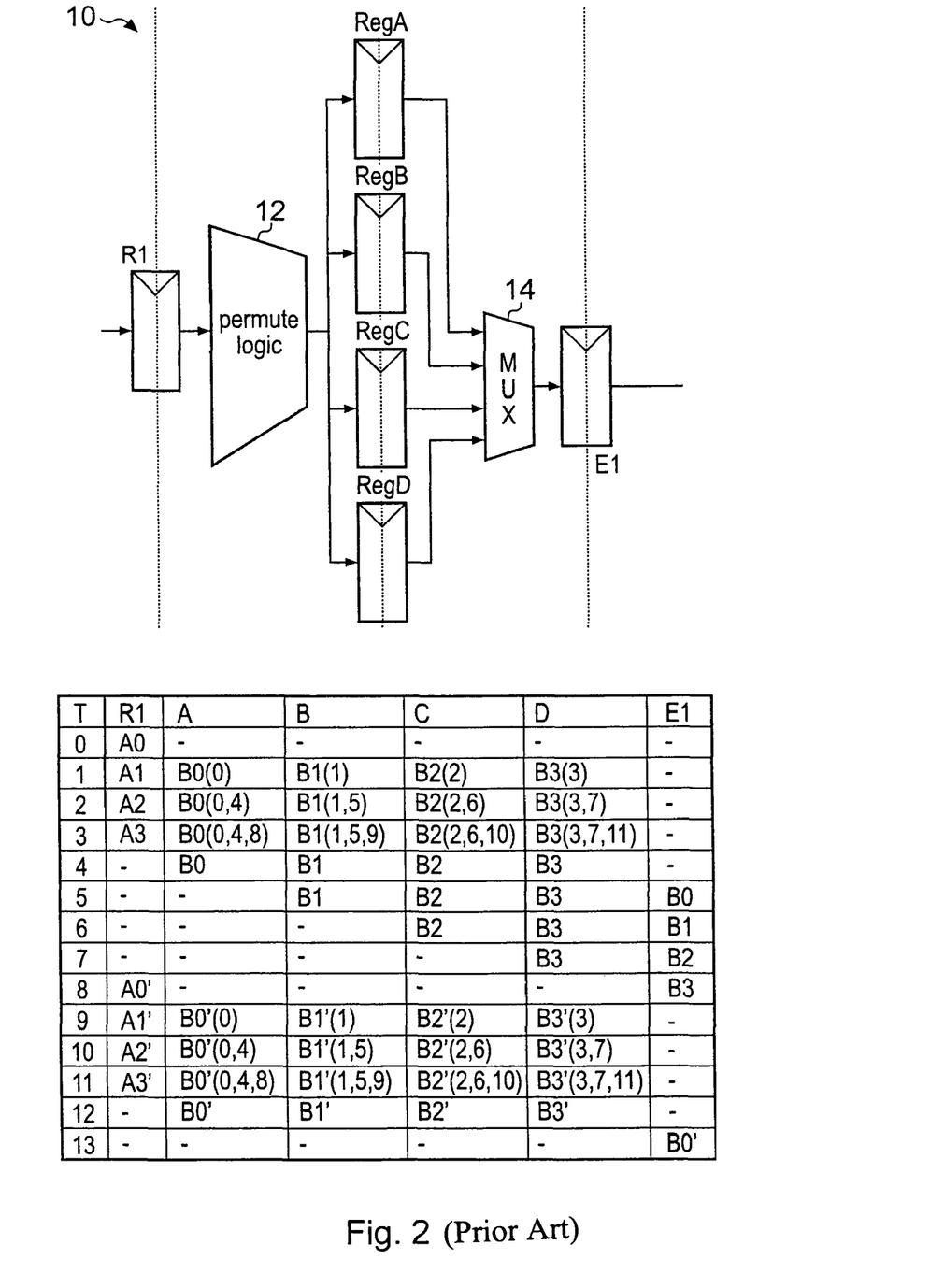
FIG. 2 illustrates an known arrangement of the permute unit shown in FIG. 1.

FIG. 2 illustrates in more detail a known arrangement of the permute unit 10. The permute unit 10 comprises a register R1 which receives each group of data elements $A_0$ to $A_3$. Each group of data elements is provided to permute logic 12, which distributes the data elements within each group across the registers A to D. Once all the groups of data elements have been distributed across the registers A to D, a multiplexer 14 reads any one of the registers A to D and provide that content to the register E1.

Hence, in response to the instruction VLD 4.16, in a first clock cycle $t_0$, the register R1 will contain the first group of data elements $A_0$. Also in that cycle, any data previously held in one of the registers A to D may be output to the register E1.

In the next cycle, $t_1$, the group of data elements $A_0$ is distributed from the register R1 across the registers A to D. A similar process continues in the next three clock cycles, $t_2$ to $t_4$, until registers A to D are full. Hence, in clock cycles $t_1$ to $t_4$ no data elements are provided to the register E1 because the registers A to D are being filled.

However, in clock cycle $t_5$, the contents of the register A (which contains the permuted group of data elements $B_0$) are provided via the multiplexer 14 to the register E1. Thereafter, in clock cycle $t_6$, the contents of the register B (which contains the permuted group of data elements $B_1$) can be provided to the register E1. In clock cycle $t_7$, the contents of the register C (which contains the permuted group of data elements $B_2$) are provided to the register E1. In clock cycle $t_8$, the contents of the register D (which contains the permuted group of data elements $B_3$) are provided to the register E1.

Hence, in clock cycles $t_4$ to $t_7$ no data elements can be received by the permute logic 12 because the contents of the registers A to D are being emptied.

However, in clock cycle $t_8$, the first group of data elements $A_0'$ associated with a following permute instruction can be provided from the register R1 to the permute logic 12.

Thereafter, the operation during clock cycles $t_9$ to $t_{13}$ will be analogous to those of $t_1$ to $t_5$.

Whilst the described permute unit enables a permute operation to be performed, the performance of that permute unit is less than optimal.

Accordingly, it is desired to provide an improved technique for performing a permute operation.

SUMMARY OF THE INVENTION

Viewed from a first aspect, the present invention provides a data processing apparatus, comprising: a plurality of pipelined stages, each of the plurality pipelined stages being operable in each processing cycle to receive a group of data elements from an earlier pipelined stage; permute logic operable to buffer 'n' of the groups of data elements over a corresponding 'n' processing cycles thereby creating a bubble within pipelined stages, and forwarding logic operable, once the 'n' of the groups of data elements have been buffered by the permute logic, to forward permuted groups of data elements comprising the data elements reordered by the permute logic to fill the bubble within the pipelined stages.

The present invention recognises that a performance limitation occurs when processing sequential instructions which require the use of permute logic because there are cycles when no permuted data elements are being output from the permute logic (such as would occur when the data elements to be permuted are being buffered in the permute logic) and clock cycles exist when no further data elements may be accepted by the permute logic (such as would occur when the permute logic is being drained of the data elements stored therein). Hence, the throughput of data elements through the pipeline is not constant.

The present invention also recognises that whilst it would be possible to maximise throughput by, for example, increasing the number of registers which feed the permute logic, increasing the number of registers which receive the permuted data elements from the permute logic or by duplicating the permute logic or the registers used to buffer the data elements to be permuted, such an approach undesirably increases the amount of resources required.

The present invention also recognises that when the permute logic is provided within a pipelined stage of a pipelined processor, the period during which the data elements are being buffered by the permute logic will create a bubble within the pipelined stages. It will be appreciated that the term bubble is often used in the art to refer to the absence of any data element needing to be processed within that pipelined stage. The present invention also recognises that the bubble can be used to improve the throughput of the data processing apparatus.

Hence, forwarding logic is provided which forwards the data elements buffered within the permute logic in the pipeline in order to fill the bubble which was created when those data elements were buffered by the permute logic. By forwarding the data elements to fill the bubble an improved throughput can be achieved. This enables a constant stream of data to be transformed without the need to increase the number of input or output registers required to support the permute logic, the need to duplicate the permute logic or the need to introduce any additional storage elements.

In one embodiment the bubble is created within 'n' of the pipelined stages.

Accordingly, advantage can be taken of the fact that the number of permuted data elements which require to be forwarded will naturally match the size of the bubble within the pipeline stages.

In one embodiment, the forwarding logic is operable, once the 'n' of the groups of data elements have been buffered by the permute logic, to forward 'n' of the permuted groups of data elements to fill the bubble within the 'n' of the pipelined stages.

In one embodiment, the forwarding logic comprises selection logic and transmission paths operable to couple the forwarding logic with the 'n' of the pipelined stages.

Accordingly, through the simple provision of a combination of selection logic and transmission paths, the data elements may readily be forwarded to the subsequent pipelined stages.

In one embodiment, the forwarding logic is operable to forward permuted groups of data elements comprising the data elements reordered by the permute logic to fill the bubble within the pipelined stages in a single processing cycle.

Hence, in order to maintain maximised throughput, the forwarding logic may forward the data elements within a single cycle in order to fill the bubble.

In one embodiment, the permute logic is provided within one of the plurality of pipelined stages.

In one embodiment, 'n–1' pipelined stages are provided subsequent to the permute logic and the forwarding logic is operable, once the 'n' of the groups of data elements have been buffered by the permute logic, to forward one of the permuted groups of data elements to a final of the 'n–1' pipelines stages and, in a subsequent processing cycle, to forward the remaining 'n–1' of the permuted groups of data elements to fill the bubble within the 'n–1' of the pipelined stages.

Accordingly, in the event that the number of pipelined stages that follow the permute logic is less than the number of permuted groups of data elements, a first permuted group of data elements is forwarded to the end of the pipeline, with the remaining permuted groups of data elements then being forwarded thereafter to fill the bubble.

In one embodiment, the permute logic comprises reception and extraction logic and a plurality of buffer registers, the reception and extraction logic being operable to receive each one of the 'n' groups of the data elements in a corresponding processing cycle and to extract a data element from each group of data elements for storage by a corresponding one of the plurality of buffer registers thereby providing the permuted groups of data elements.

According to a second aspect of the present invention there is provided a data processing apparatus, comprising: a plurality of pipelined stages, each of the plurality pipelined stages being operable in each processing cycle to receive a group of data elements from an earlier pipelined stage; forwarding logic operable to forward a plurality of groups of data elements to create a bubble within pipelined stages; and permute logic operable to buffer 'n' of the groups of the data elements forwarded by the forwarding logic and to provide permuted groups of data elements comprising reordered data elements over a corresponding plurality of processing cycles to fill the bubble within the pipelined stages.

Hence, forwarding logic may be provided which forwards data elements to the permute logic in order to create a bubble within the pipelined stages. The permute logic receives the forwarded data elements for buffering therein and then provides the permuted data elements over a number of processing cycles in order to fill the bubble created within the pipelined stages.

In one embodiment, the forwarding logic is operable, once the 'n' of the groups of data elements have been received by the pipelined stages, to forward 'n' of the groups of data elements to create the bubble within 'n' of the pipelined stages.

In one embodiment, the forwarding logic comprises selection logic and transmission paths operable to couple the forwarding logic with the 'n' of the pipelined stages.

In one embodiment, the forwarding logic is operable to forward a plurality of the groups of data elements to create a bubble within pipelined stages in a single processing cycle.

Accordingly, the bubble may be created within a single processing cycle.

In one embodiment, the permute logic is provided within one of the plurality of pipelined stages.

In one embodiment, the permute logic comprises reception and extraction logic and a plurality of buffer registers, the reception and extraction logic being operable to receive each one of the 'n' groups of data elements in a single processing cycle and to extract a data element from each group of data elements for storage by a corresponding one of the plurality of buffer registers thereby generating the permuted groups of data elements.

In one embodiment, the permute logic is operable to provide one of the 'n' of permuted groups of data elements over a corresponding 'n' processing cycles thereby filing the bubble.

Accordingly, the permute logic takes advantage of the fact that the size of the bubble created within the pipeline stages will match the number of permuted data elements required to be provided from the permute logic, thereby filling the bubble.

According to a third aspect of the present invention, in a data processing apparatus comprising a plurality of pipelined stages, each of the plurality pipelined stages being operable in each processing cycle to receive a group of data elements from an earlier pipelined stage, there is provided a method of permuting data comprising the steps of: buffering 'n' of the groups of data elements over a corresponding 'n' processing cycles thereby creating a bubble within pipelined stages; and once the 'n' of the groups of data elements have been buffered by the permute logic, forwarding permuted groups of data elements comprising the data elements reordered by the permute logic to fill the bubble within the pipelined stages.

According to a fourth aspect of the present invention, in a data processing apparatus comprising a plurality of pipelined stages, each of the plurality pipelined stages being operable in each processing cycle to receive a group of data elements from an earlier pipelined stage, there is provided a method of permuting data comprising the steps of: forwarding a plurality of groups of data elements to create a bubble within pipelined stages; buffering 'n' of the plurality of groups of the data elements forwarded during the forwarding step logic; and providing permuted groups of data elements comprising reordered data elements over a corresponding plurality of processing cycles to fill the bubble within the pipelined stages.

The above, and other objects, and features and advantages of this invention will be apparent from the following detailed description of illustrative embodiments which is to be read in conjunction with the accompanying drawings.

BRIEF DESCRIPTION OF THE DRAWINGS

Embodiments of the present invention will now be described with reference to the accompanying drawings in which.

DESCRIPTION OF THE EMBODIMENTS

Figure 3A:
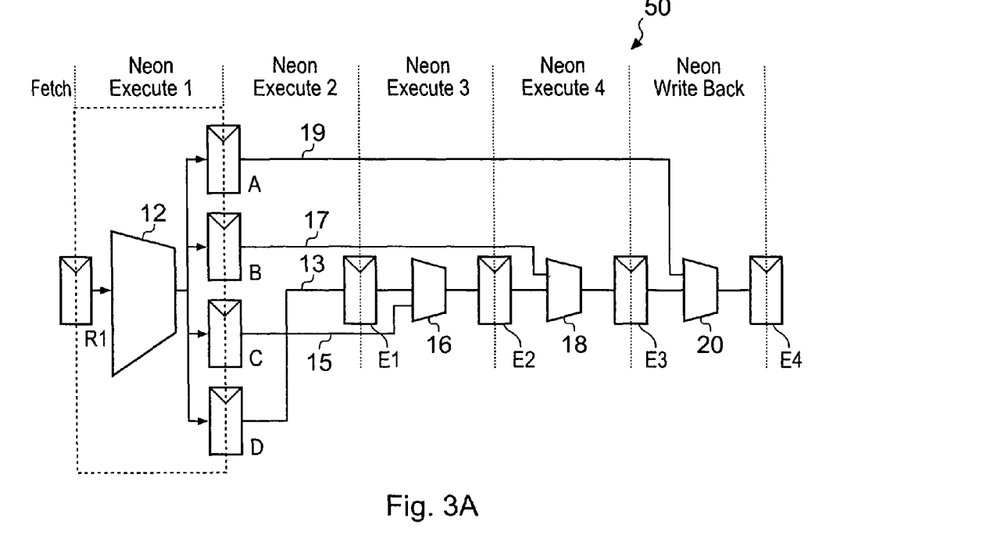
FIG. 3A to 3D illustrate an arrangement and example operations of a data processing apparatus incorporating permute logic and forwarding logic according to a first embodiment of the present invention.

FIG. 3A illustrates a data processing apparatus, generally 50, including forwarding logic and permute logic according to a first embodiment of the present invention. The data processing apparatus 50 has a plurality of pipelined stages.

The pipeline stages include a fetch stage and four execute stages. In overview, data elements provided to the permute logic 12 from the register R1 are distributed across the registers A to D. Whilst the data elements are being distributed across the registers A to D by the permute logic 12, a bubble is created in the subsequent pipelined stages. Accordingly, forwarding logic in the form of multiplexers 14, 16 and 18, together with the paths 13, 15, 17 and 19 are provided which enable data elements from the registers A to D to be forwarded to the subsequent pipelined stages in order to fill the bubble. Accordingly, as will be explained in more detail below, this arrangement enables data elements to be provided in each clock cycle to the permute logic 12 and permuted data to be provided in each clock cycle by the register E4. In this way, the overall throughput of the pipeline is maximised.

In the fetch stage, the register R1 receives data elements either from the register file 6 (not shown) or over the path 7 (not shown) via the multiplexer 8 (not shown).

In the neon execute 1 stage, the permute logic 12 receives data elements from the register R1 and distributes these data elements across the registers A to D.

In the neon execute 2 stage, the register E1 receives data elements over the path 13 from the register D.

In the neon execute 3 stage, the multiplexer 16 receives data elements from the register E1 and from the register C. The output from the multiplexer 16 is provided to the register E2.

In the neon execute 4 stage, the multiplexer 18 receives data from register B over the path 17 and also data from the register E2.

In the neon write back stage, multiplexer 20 receives data from register A over the path 19 and also from data from the register E4. This data is used to update the either a register file (not shown) or added to a store queue (not shown), as appropriate.

The operation of the data processing apparatus 50 will now be explained in more detail with reference to FIGS. 3B to 3D which illustrate processing in response to different permute instructions.

Figure 3B:
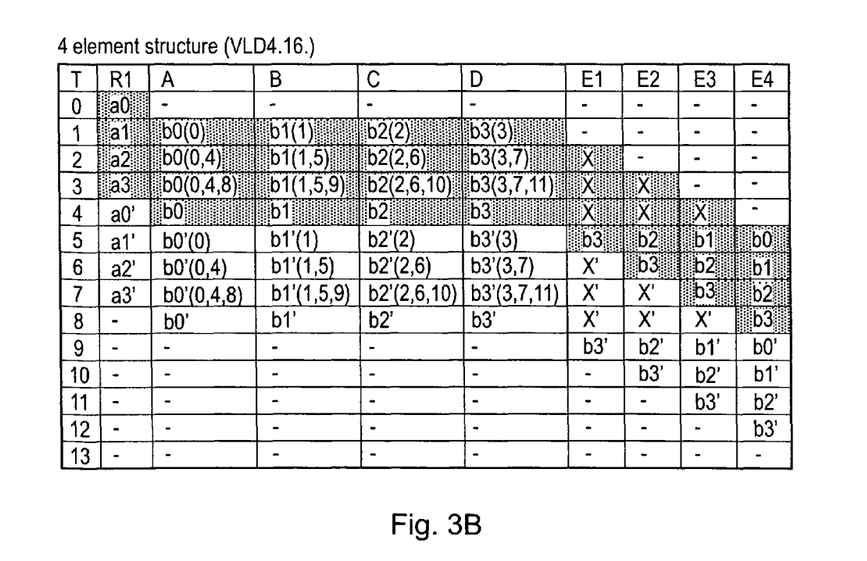

As shown in FIG. 3B, in clock cycle $t_0$, in response to a permute instruction VLD 4.16, the register R1 receives the data elements comprising group $A_0$. The registers A to D and E1 to E4 may contain data elements related to a previous instruction (denoted by dashes).

In clock cycle $t_1$, the data elements comprising group $A_0$ are then distributed across the registers A to D. The registers E1 to E4 may still contain data elements related to a previous instruction (denoted by dashes). The register R1 receives the data elements comprising group $A_1$.

In clock cycle $t_2$, the data elements comprising group $A_1$ are then distributed across the registers A to D. The register R1 receives the data elements of group $A_2$. Registers E2 to E4 may still contain data related to a previous instruction, but register E1 will now contain a bubble (denoted by X) because no data will have been provided from the neon execute 1 stage.

In clock cycle $t_3$, the data elements comprising group $A_2$ are then distributed across the registers A to D. The register R1 receives the data elements of group $A_3$. Registers E3 and E4 may still contain data elements related to a previous instruction, but registers E1 and E2 will now both contain a bubble since no data will have been provided from the neon execute 1 stage for two cycles.

In clock cycle $t_4$, the data elements comprising group $A_3$ are then distributed across the registers A to D. Accordingly, the registers A to D now contain the permuted groups $B_0$ to $B_3$ respectively. The register R1 receives the data elements of group $A_0'$ corresponding to a subsequent permute instruction. Register E4 may still contain data elements related to a previous instruction, but registers E1 to E3 each contain a bubble since no data will have been provided from the neon execute 1 stage for three cycles.

In clock cycle $t_5$, the permuted data elements are forwarded by the forwarding logic to fill the bubble in the pipeline. In particular, the permuted group $B_0$ is forwarded over the path 19, selected by the multiplexer 20 and provided to the register E4; the permuted group $B_1$ is forwarded over the path 17, selected by the multiplexer 18 and provided to the register E3; the permuted group $B_2$ is forwarded over the path 15, selected by the multiplexer 16 and provided to the register E2; and the permuted group $B_3$ is forwarded over the path 13 and provided to the register E1. The data elements comprising group $A_0'$ are then distributed across the registers A to D. The register R1 receives the data elements of group $A_1'$.

In clock cycle $t_6$, the data elements comprising group $A_1'$ are then distributed across the registers A to D. The register R1 receives the data elements of group $A_2'$. Registers E2 to E4 contain the permuted groups $B_3$ to $B_1$ respectively, but register E1 will now contain a bubble (denoted by X') because no data will have been provided from the neon execute 1 stage.

In clock cycle $t_7$, the data elements comprising group $A_2'$ are then distributed across the registers A to D. The register R1 receives the data elements of group $A_3'$. Registers E3 and E4 contain the permuted groups $B_3$ and $B_2$ respectively, but registers E1 and E2 will now both contain a bubble since no data will have been provided from the neon execute 1 stage for two cycles.

In clock cycle $t_8$, the data elements comprising group $A_3'$ are then distributed across the registers A to D. Accordingly, the registers A to D now contain the permuted groups $B_0'$ to $B_3'$ respectively. The register R1 receives the data elements corresponding to a subsequent instruction. Register E4 contains the permuted group $B_3$, but registers E1 to E3 each contain a bubble since no data will have been provided from the neon execute 1 stage for three cycles.

In clock cycle $t_9$, the permuted data elements are forwarded by the forwarding logic to fill the bubble in the pipeline. In particular, the permuted group $B_0'$ is forwarded over the path 19, selected by the multiplexer 20 and provided to the register E4; the permuted group $B_1'$ is forwarded over the path 17, selected by the multiplexer 18 and provided to the register E3; the permuted group $B_2'$ is forwarded over the path 15, selected by the multiplexer 16 and provided to the register E2; and the permuted group $B_3'$ is forwarded over the path 13 and provided to the register E1. The data elements received by register R1 in clock cycle $t_8$ are then distributed across the registers A to D. The register R1 receives the next data elements.

In clock cycles $t_{10}$ to $t_{13}$ the permuted groups $B_0'$ to $B_3'$ pass through the pipeline.

Accordingly, it can be seen that by utilising forwarding logic to fill the bubbles in the subsequent pipelined stages, the throughput of data elements provided to the permute logic and the data elements provided by the register E4 can be maximised. Hence, instead of back-to-back permute instructions having to wait for seven cycles before they can be executed (as would be required in the FIG. 1 arrangement), the instructions now can be executed every four cycles (i.e. without any delay at all). It will be appreciated that this significantly improves the performance of the data processing apparatus 50 when executing permute instructions.

Figure 3C:
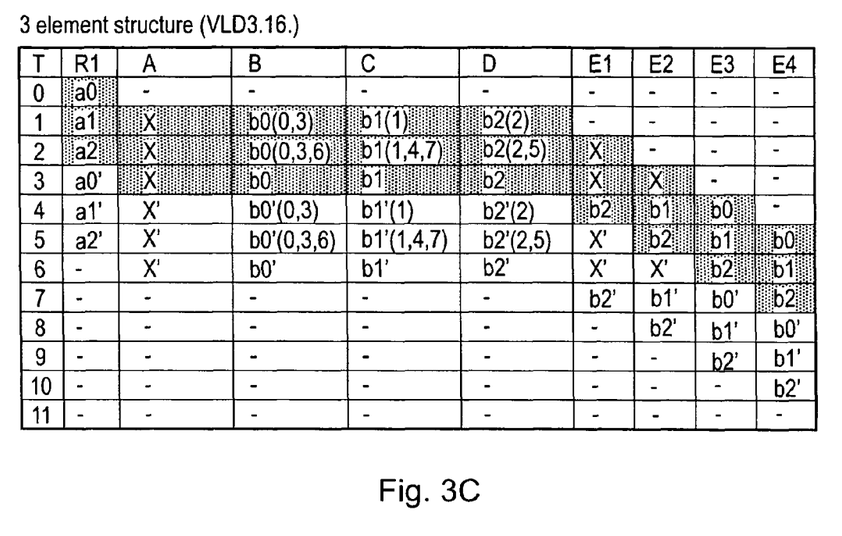

As shown in FIG. 3C, in clock cycle $t_0$, in response to a permute instruction VLD 3.16, the register R1 receives the data elements comprising group $A_0$. The registers A to D and E1 to E4 may contain data elements related to a previous instruction (denoted by dashes).

In clock cycle $t_1$, the data elements comprising group $A_0$ are then distributed across the registers B to D. Register A is not utilised when processing this instruction as only three permuted groups will be generated. The registers E1 to E4 may still contain data elements related to a previous instruction (denoted by dashes). The register R1 receives the data elements comprising group $A_1$.

In clock cycle $t_2$, the data elements comprising group $A_1$ are then distributed across the registers B to D. The register R1 receives the data elements of group $A_2$. Registers E2 to E4 may still contain data related to a previous instruction, but register E1 will now contain a bubble (denoted by X) because no data will have been provided from the neon execute 1 stage.

In clock cycle $t_3$, the data elements comprising group $A_2$ are then distributed across the registers B to D. Accordingly, the registers B to D now contain the permuted groups $B_0$ to $B_2$ respectively. The register R1 receives the data elements of group $A_0'$ corresponding to a subsequent permute instruction. Registers E3 and E4 may still contain data elements related to a previous instruction, but registers E1 and E2 will now both contain a bubble since no data will have been provided from the neon execute 1 stage for two cycles.

In clock cycle $t_4$, the permuted data elements are forwarded by the forwarding logic to fill the bubble in the pipeline. In particular, the permuted group $B_0$ is forwarded over the path 17, selected by the multiplexer 18 and provided to the register E3; the permuted group $B_1$ is forwarded over the path 15, selected by the multiplexer 16 and provided to the register E2; and the permuted group $B_2$ is forwarded over the path 13 and provided to the register E1. The data elements comprising group $A_0'$ are then distributed across the registers B to D. The register R1 receives the data elements of group $A_1'$.

In clock cycle $t_5$, the data elements comprising group $A_1'$ are then distributed across the registers B to D. The register R1 receives the data elements of group $A_2'$. Registers E2 to E4 contain the permuted groups $B_2$ to $B_0$ respectively, but register E1 will now contain a bubble (denoted by X') because no data will have been provided from the neon execute 1 stage.

In clock cycle $t_6$, the data elements comprising group $A_2'$ are then distributed across the registers B to D. Accordingly, the registers B to D now contain the permuted groups $B_0'$ to $B_2'$ respectively. The register R1 receives data corresponding to a subsequent instruction. Registers E3 and E4 contain permuted groups $B_2$ and $B_1$ respectively, but registers E1 and E2 will now both contain a bubble since no data will have been provided from the neon execute 1 stage for two cycles.

In clock cycle $t_7$, the permuted data elements are forwarded by the forwarding logic to fill the bubble in the pipeline. In particular, the permuted group $B_0 \propto$ is forwarded over the path 17, selected by the multiplexer 18 and provided to the register E3; the permuted group $B_1'$ is forwarded over the path 15, selected by the multiplexer 16 and provided to the register E2; and the permuted group $B_2'$ is forwarded over the path 13 and provided to the register E1. Register E4 contains permuted group $B_2$.

In clock cycles $t_8$ to $t_{10}$ the permuted groups $B_0'$ to $B_2'$ pass through the pipeline.

Accordingly, it can be seen that even for a different permute instruction, by utilising forwarding logic to fill the bubbles in the subsequent pipelined stages, the throughput of data elements provided to the permute logic and the data elements provided by the register E4 can be maximised.

Figure 3D:
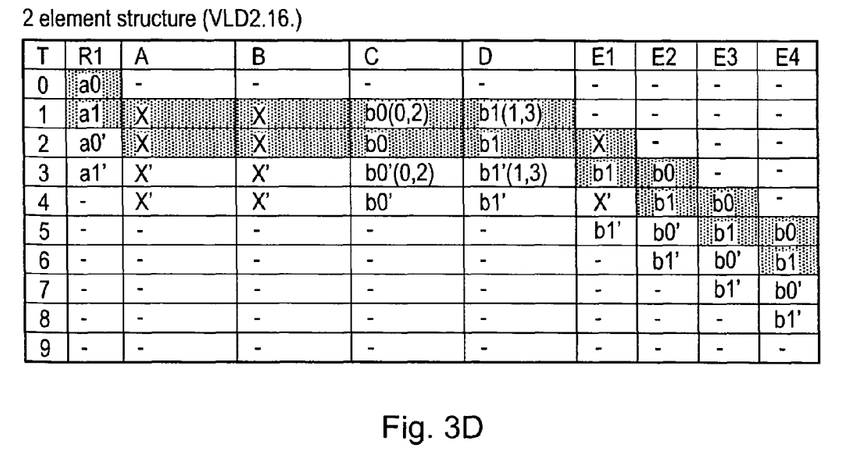

As shown in FIG. 3D, in clock cycle $t_0$, in response to a permute instruction VLD 2.16, the register R1 receives the data elements comprising group $A_0$. The registers A to D and E1 to E4 may contain data elements related to a previous instruction (denoted by dashes).

In clock cycle $t_1$, the data elements comprising group $A_0$ are then distributed across the registers C and D. Registers A and B are not utilised when processing this instruction as only two permuted groups will be generated. The registers E1 to E4 may still contain data elements related to a previous instruction (denoted by dashes). The register R1 receives the data elements comprising group $A_1$.

In clock cycle $t_2$, the data elements comprising group $A_1$ are then distributed across the registers C and D. Accordingly, the registers C and D now contain the permuted groups $B_0$ and $B_1$ respectively. Registers E2 to E4 may still contain data related to a previous instruction, but register E1 will now contain a bubble (denoted by X) because no data will have been provided from the neon execute 1 stage. The register R1 receives the data elements of group $A_0'$ corresponding to a subsequent permute instruction.

In clock cycle $t_3$, the permuted data elements are forwarded by the forwarding logic to fill the bubble in the pipeline. In particular, the permuted group $B_0$ is forwarded over the path 15, selected by the multiplexer 16 and provided to the register E2; and the permuted group $B_1$ is forwarded over the path 13 and provided to the register E1. The data elements comprising group $A_0'$ are then distributed across the registers C and D. The register R1 receives the data elements of group $A_1'$.

In clock cycle $t_4$, the data elements comprising group $A_1'$ are then distributed across the registers C and D. Accordingly, the registers C and D now contain the permuted groups $B_0'$ and $B_1'$ respectively. Register E4 may still contain data related to a previous instruction, registers E2 and E3 contain permuted groups B1 and B0 respectively, but register E1 will now contain a bubble (denoted by X) because no data will have been provided from the neon execute 1 stage. The register R1 receives the data elements corresponding to a subsequent instruction.

In clock cycles $t_5$ to $t_9$ the permuted groups $B_0$ and $B_1$, and $B_0'$ and $B_1'$ pass through the pipeline.

Accordingly, it can be seen that even for a yet different permute instruction, by utilising forwarding logic to fill the bubbles in the subsequent pipelined stages, the throughput of data elements provided to the permute logic and the data elements provided by the register E4 can be maximised.

Figure 4:
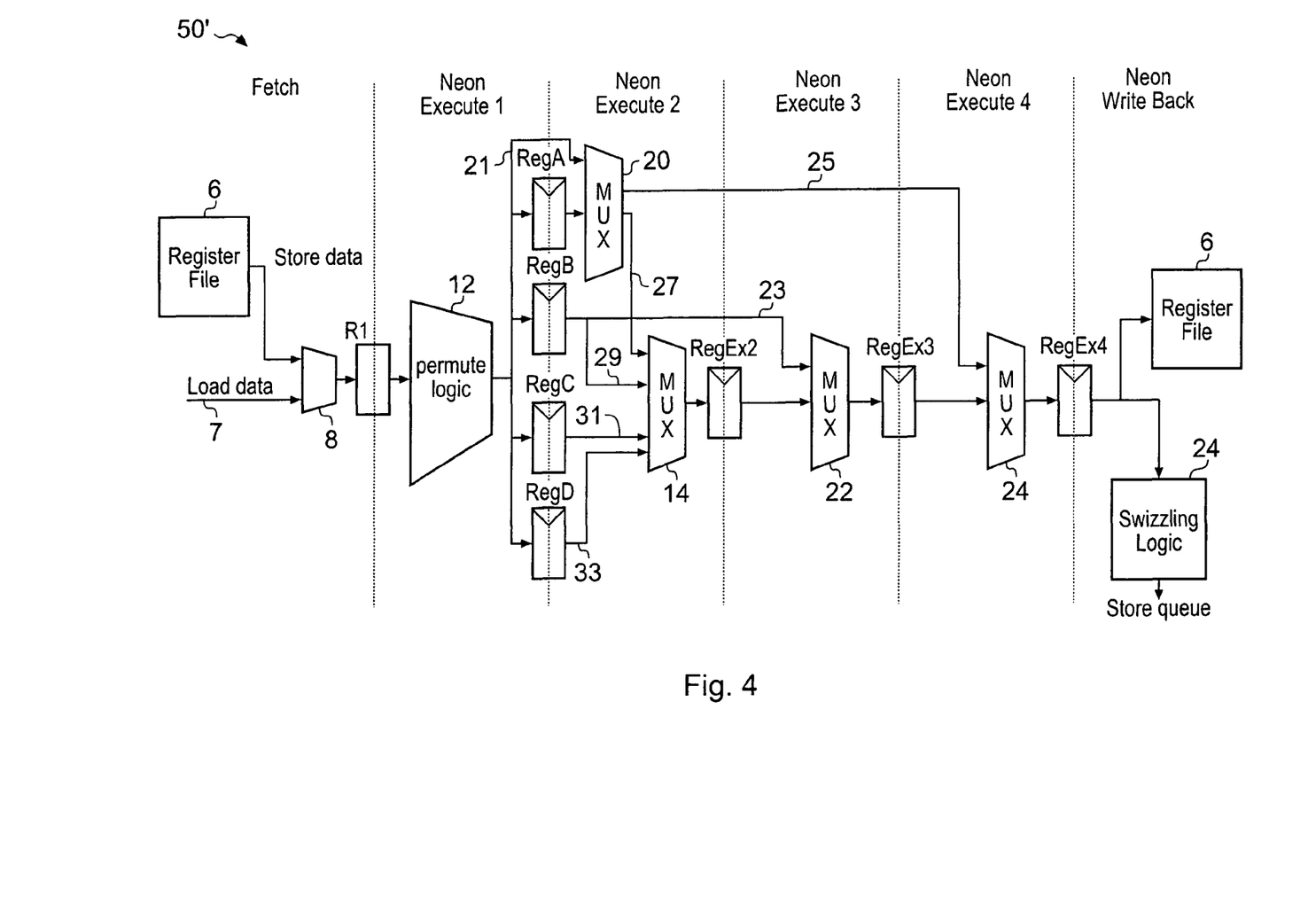
FIG. 4 illustrates a data processing apparatus incorporating permute logic and forwarding logic according to a second embodiment of the present invention.

FIG. 4 illustrates a data processing apparatus, generally 50', including forwarding logic and permute logic according to a second embodiment of the present invention. The data processing apparatus 50' has a plurality of pipelined stages.

The pipeline stages include a fetch stage, four execute stages and a write-back stage. In overview, data elements provided to the permute logic 12 from the register R1 are distributed across the registers A to D. Whilst the data elements are being distributed across the registers A to D by the permute logic 12, a bubble is created in the subsequent pipelined stages. Accordingly, forwarding logic in the form of multiplexers 14, 20, 22 and 24, together with the paths 21, 23, 25, 27, 29, 31 and 33 are provided which enable data elements from the registers A to D to be forwarded to the subsequent pipelined stages in order to fill the bubble. Accordingly, this arrangement enables data elements to be provided in each clock cycle to the permute logic 12 and permuted data to be provided in each clock cycle by the register E4. In this way, the overall throughput of the pipeline is maximised. Because the number of registers in subsequent pipelined stages is less than the number of permuted groups for a VLD 4.16 instruction, the multiplexer 20 enables data elements to be forwarded directly from the permute logic 12 to the neon execute 4 stage. Hence, the permuted data group $B_0$ will initially be forwarded directly to the neon execute 4 stage, with the remaining permuted groups $B_1$ to $B_3$ being forwarded in the subsequent clock cycle to fill the bubble in the in the neon execute 2 to neon execute 4 stages.

Figure 5:
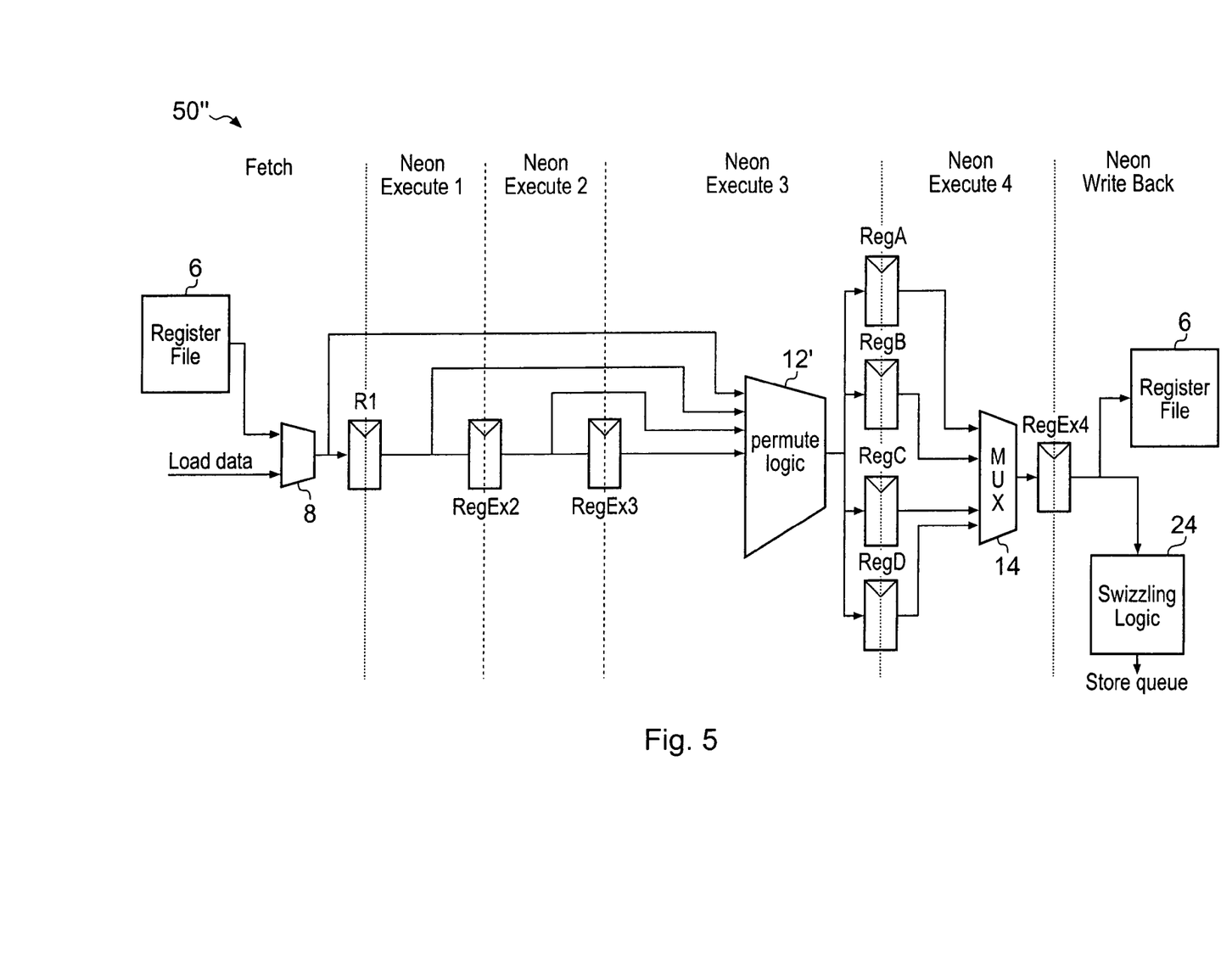
FIG. 5 illustrates a data processing apparatus incorporating permute logic and forwarding logic according to a third embodiment of the present invention

FIG. 5 illustrates a data processing apparatus, generally 50", according to a third embodiment of the present invention. In this arrangement, data elements flow into the fetch and neon execute 1 to 3 stages. These data elements are then forwarded to the neon execute 4 stage which contains the permute logic. Forwarding the data in this way will create a bubble in the pipeline which can then be filled at the neon execute stage with groups of permuted data elements.

Hence, the bubble created in the fetch, neon execute 1 and neon execute 2 stages when forwarding the data elements stored therein is filled at the neon execute 4 stage with permuted groups of data elements. In this way, the delay between processing back to back permute instructions is reduced. Also, the performance throughput of the pipeline is maximised since data elements can be constantly provided to the neon execute 1 stage and constantly output by the neon execute 4 stage.

Accordingly, the performance limitation which would otherwise occur when processing sequential instructions due to there being cycles when no permuted data elements are being output from the permute logic and cycles when no further data elements may be accepted by the permute logic is overcome. Hence, the throughput of data elements through the pipeline can be constant. The performance improvement is achieved without undesirably increasing the amount of resources required by the permute unit. This performance improvement is achieved by utilising a bubble within the pipelined stages created during the period during which the data elements are being buffered by the permute logic. Forwarding logic forwards the data elements buffered within the permute logic in the pipeline in order to fill the bubble which enables a constant stream of data to be transformed. Alternatively, forwarding logic forwards data elements to the permute logic in order to create a bubble within the pipelined stages. The permute logic receives the forwarded data elements for buffering therein and then provides the permuted data elements over a number of processing cycles in order to fill the bubble created within the pipelined stages which also enables a constant stream of data to be transformed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus, comprising:
a plurality of pipelined stages, each of said plurality pipelined stages in each processing cycle configured to receive a group of data elements from an earlier pipelined stage, said plurality of pipelined stages comprises at least 'n' pipelined stages wherein 'n' is a positive integer;
permute logic configured to buffer 'n' of said groups of data elements over a corresponding 'n' processing cycles thereby creating a bubble within pipelined stages; and
forwarding logic, once said 'n' of said groups of data elements have been buffered by said permute logic, configured to forward permuted groups of data elements comprising said data elements reordered by said permute logic to fill said bubble within said pipelined stages.

2. The data processing apparatus of claim 1, wherein said bubble is created within 'n' of said pipelined stages.

3. The data processing apparatus of claim 2, wherein said forwarding logic, once said 'n' of said groups of data elements have been buffered by said permute logic, is configured to forward 'n' of said permuted groups of data elements to fill said bubble within said 'n' of said pipelined stages.

4. The data processing apparatus of claim 3, wherein said forwarding logic comprises selection logic and transmission paths configured to couple said forwarding logic with said 'n' of said pipelined stages.

5. The data processing apparatus of claim 1, wherein said forwarding logic is configured to forward permuted groups of data elements comprising said data elements reordered by said permute logic to fill said bubble within said pipelined stages in a single processing cycle.

6. The data processing apparatus of claim 1, wherein said permute logic is provided within one of said plurality of pipelined stages.

7. The data processing apparatus of claim 6, wherein 'n−1' pipelined stages are provided subsequent to said permute logic and said forwarding logic, once said 'n' of said groups of data elements have been buffered by said permute logic, is configured to forward one of said permuted groups of data elements to a final of said 'n−1' pipelines stages and, in a subsequent processing cycle, to forward the remaining 'n−1' of said permuted groups of data elements to fill said bubble within said 'n−1' of said pipelined stages, wherein 'n' is an integer greater than 1.

8. The data processing apparatus of claim 1, wherein said permute logic comprises reception and extraction logic and a plurality of buffer registers, said reception and extraction logic configured to receive each one of said 'n' groups of said data elements in a corresponding processing cycle and to extract a data element from each group of data elements for storage by a corresponding one of said plurality of buffer registers thereby providing said permuted groups of data elements.

9. A data processing apparatus, comprising:
- a plurality of pipelined stages, each of said plurality pipelined stages in each processing cycle configured to receive a group of data elements from an earlier pipelined stage, said plurality of pipelined stages comprises at least 'n' pipelined stages wherein 'n' is a positive integer;
- forwarding logic configured to forward a plurality of groups of data elements to create a bubble within pipelined stages; and
- permute logic configured to buffer 'n' of said groups of said data elements forwarded by said forwarding logic and to provide permuted groups of data elements comprising reordered data elements over a corresponding plurality of processing cycles to fill said bubble within said pipelined stages.

10. The data processing apparatus of claim 9, wherein said forwarding logic, once said 'n' of said groups of data elements have been received by said pipelined stages, is configured to forward 'n' of said groups of data elements to create said bubble within 'n' of said pipelined stages.

11. The data processing apparatus of claim 10, wherein said forwarding logic comprises selection logic and transmission paths configured to couple said forwarding logic with said 'n' of said pipelined stages.

12. The data processing apparatus of claim 9, wherein said forwarding logic is configured to forward a plurality of said groups of data elements to create a bubble within pipelined stages in a single processing cycle.

13. The data processing apparatus of claim 9, wherein said permute logic is provided within one of said plurality of pipelined stages.

14. The data processing apparatus of claim 9, wherein said permute logic comprises reception and extraction logic and a plurality of buffer registers, said reception and extraction logic configured to receive each one of said 'n' groups of data elements in a single processing cycle and to extract a data element from each group of data elements for storage by a corresponding one of said plurality of buffer registers thereby generating said permuted groups of data elements.

15. The data processing apparatus of claim 13, wherein said permute logic is configured to provide one of said 'n' of permuted groups of data elements over a corresponding 'n' processing cycles thereby filing said bubble.

16. In a data processing apparatus comprising a plurality of pipelined stages, each of said plurality pipelined stages in each processing cycle configured to receive a group of data elements from an earlier pipelined stage, a method of permuting data comprising the steps of:
- buffering 'n' of said groups of data elements over a corresponding 'n' processing cycles thereby creating a bubble within pipelined stages, wherein 'n' is an integer; and
- once said 'n' of said groups of data elements have been buffered by said permute logic, forwarding permuted groups of data elements comprising said data elements reordered by said permute logic to fill said bubble within said pipelined stages.

17. In a data processing apparatus comprising a plurality of pipelined stages, each of said plurality pipelined stages in each processing cycle configured to receive a group of data elements from an earlier pipelined stage, a method of permuting data comprising the steps of:
- forwarding a plurality of groups of data elements to create a bubble within pipelined stages;
- buffering 'n' of said plurality of groups of said data elements forwarded during said forwarding step logic, wherein 'n' is an integer; and
- providing permuted groups of data elements comprising reordered data elements over a corresponding plurality of processing cycles to fill said bubble within said pipelined stages.

* * * * *